United States Patent Office 2,755,562
Patented July 24, 1956

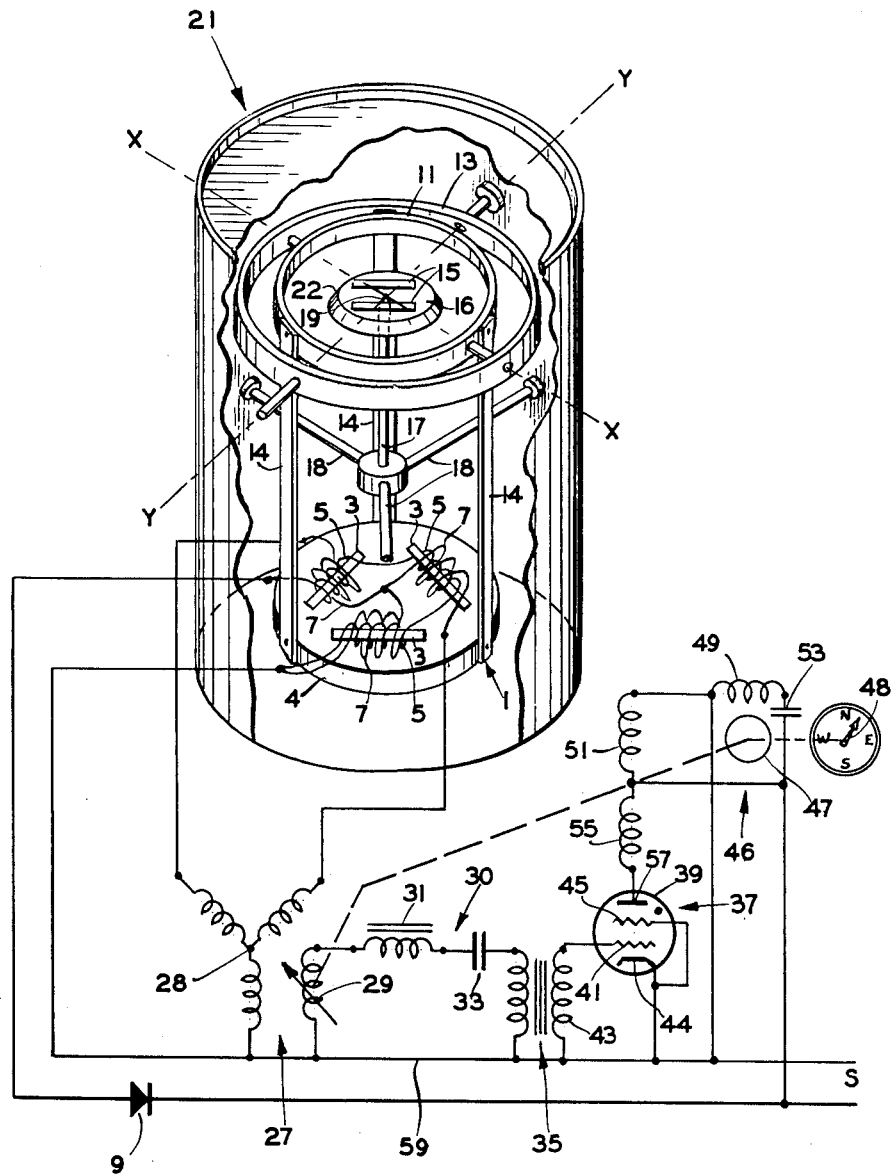

2,755,562

COMPASS SYSTEM

Charles E. Hurlburt, Teaneck, N. J., assignor to Bendix Aviation Corporation, Teterboro, N. J., a corporation of Delaware Application April 17, 1951, Serial No. 221,447

3 Claims. (Cl. 33—222)

The invention relates generally to data transmission systems, and more particularly to compass systems wherein direction indications are provided remote from a transmitter sensitive to the earth's magnetic field, and which may comprise a permanent magnet and a flux valve.

The flux valve, as referred to in the present specification and claims, is a device which interacts with a magnetic field and provides an electrical signal of a phase and magnitude determined by the position of the flux valve in the magnetic field.

One object of the present invention is to provide a compass system for use in aircraft having a flux valve responsive to the magnetic field provided by a permanent magnet oriented angularly by the earth's magnetic field and positioned in a plane parallel to the plane of the flux valve and coaxial with the flux valve irrespective of the attitude of the craft in which the compass system is mounted.

Another object is to provide a compass system in which the direction of the earth's magnetic field is indicated remotely by an indicator operated by a servo system utilizing a single thyratron tube and responsive to the flux valve.

The invention contemplates a compass system having a flux valve supported by a pair of gimbals rotatable about mutually perpendicular axes and a permanent magnet associated therewith and mounted for rotation about the axis of the flux valve and positioned in a plane parallel to the plane of the flux valve. In a preferred embodiment, the magnet is supported at a point coinciding with the point of intersection of the gimbal axes. The magnet and flux valve may be immersed in a viscous fluid to damp their movements.

The compass system preferably includes a servo having driving means for operating a pointer and connected across an alternating power source and driven in one direction thereby when the signal from the flux valve as determined by the position of the flux valve in the magnetic field is of one phase. When the flux valve is positioned in the magnetic field so that the signal induced therein is of the opposite phase a thyratron tube fires and energizes the driving means for rotation in the opposite direction in opposition to the power source.

The foregoing and other objects and advantages of the invention will appear more fully hereinafter from a consideration of the detailed description which follows, taken together with the accompanying drawing wherein one embodiment of the invention is illustrated. It is to be expressly understood, however, that the drawing is for the purposes of illustration and description only, and is not to be construed as defining the limits of the invention.

The single figure of the drawing shows a compass system constructed according to the invention. The transmitter is shown in perspective and the electrical components are shown schematically.

Referring now to the drawing for a more detailed description of the novel compass system of the present invention, the compass system is shown as comprising a transmitter including a flux valve 1 substantially of the kind shown and described in application Serial No. 151,402, filed March 23, 1950, by John F. Emerson, now Patent No. 2,710,942 issued June 14, 1955, and assigned to the same assignee as the present application. The flux valve includes a plurality of core members 3 arranged on a platform 4 in the form of an equilateral triangle and each core member has a primary winding 5 and a secondary winding 7 wound thereon. The primary windings are connected in series with one another through a half-wave rectifier 9 to an alternating current source S and the secondary windings are connected together in "Y" relationship and each has induced threin an alternating current voltage of the same frequency as the alternating current source, the phase sense and magnitude being determined by the position of the flux valve relative to the magnetic field.

The flux valve is pendulously suspended in the craft by a pair of gimbals 11, 13 rotatable about mutually perpendicular axes XX and YY so that the flux valve is positioned in a horizontal plane irrespective of the attitude of the craft. The platform of the flux valve may be supported rigidly by a plurality of straps 14 from gimbal 11.

A pair of permanent magnets 15 are mounted on a compass card 16 supported by pivot 17 secured by rods 18 to a housing 21 enclosing the transmitter. The compass card is supported by pivot 17 from a point 19 at the intersection of axes XX and YY so that the compass card may rotate freely in azimuth relative to the flux valve and so that the magnets are aligned with the horizontal component of the earth's magnetic field. The compass card is pendulous also so that it pivots about point 19 to position the magnets substantially in a horizontal plane irrespective of the attitude of the craft mounting the compass system. With the suspension described, if the flux valve swings about point 19 in response to acceleration of the craft, compass card 16 pivots also and is always coaxial with the flux valve and magnets 15 are always in a plane parallel to the plane of the flux valve.

The magnet and flux valve are enclosed in housing 21 and the housing preferably is filled with viscous fluid to damp movement of the compass card and flux valve. The compass card preferably has an inclined circumferential face 22 to resist pivotal movement in the fluid.

With the arrangement described, a signal of greater magnitude is induced in the secondary windings of the flux valve by the uni-directional pulsating current in the presence of the field of the permanent magnet 15 than would be induced in the flux valve in the presence of the relatively weak earth's magnetic field alone.

A receiver inductive device 27 has a three-circuit stator winding 28 connected back-to-back to the secondary windings of the flux valve and a single circuit rotor winding 29 inductively coupled thereto and connected to a broadly tuned circuit 30, including an inductance 31, a capacitance 33 and a matching transformer 35. The tuned circuit converts the irregular wave form of the signal substantially to a sine wave.

The sine wave from tuned circuit 30 is applied to a control circuit 37 preferably of the kind shown and described in applicant's copending application Serial No. 220,034, filed April 9, 1951, and assigned to the same assignee as the present application. The control circuit preferably comprises a single thyratron tube 39 having its control grid 41 connected to one end of secondary winding 43 of transformer 35. Cathode 44 and screen grid 45 of thyratron tube 39 are connected together and to the other end of secondary winding 43 of transformer 35.

A two-phase reversible motor 46 has a rotor 47 drivably connected to a direction indicator 48 and to rotor 29 of inductive device 27. The motor also has a pair of field windings 49, 51 connected through a phasing condenser 53 to alternating current source S. Motor 46 also has an auxiliary field winding 55 connected to plate 57 of thyratron tube 39.

The primary and secondary windings of the flux valve, the stator and rotor windings of the inductive device, transformer 35, cathode 44 of thyratron tube 39 and field windings 49, 51 of motor 46 are connected by a common lead 59 to one side of alternating current source S.

When the error signal between the flux valve and inductive device 27 is opposite in phase to the voltage from source S impressed on plate 57 of thyratron tube 39 through auxiliary motor winding 55, thyratron tube 39 will not fire and windings 49, 51 exert a torque on rotor 47 to drive the rotor in one direction and rotate pointer 48 and rotor winding 29 of inductive device 27 toward null position.

When the error signal between the flux valve and inductive device 27 is in phase with the voltage from source S impressed on plate 57 of thyratron tube 39 through auxiliary motor winding 55, thyratron tube 39 fires and energizes auxiliary motor winding 55. The torque exerted by auxiliary motor winding 55 and winding 49 on rotor 47 is greater than and opposite to the torque exerted by motor windings 51, 49 on rotor 47 and the motor drives pointer 48 and rotor winding 29 in the opposite direction toward null position.

Motor 46 drives rotor 29 of receiver inductive device 27 toward electrical coincidence with the transmitter from either side of coincidence and equilibrium is attained when thyratron tube 39 passes plate current so that the torque developed by auxiliary motor winding 55 and winding 49 is equal and opposite to the torque developed by motor windings 51, 49. This is accomplished by a small phase inversion in receiver 27 of the grid voltage relative to the plate voltage which causes thyratron tube 39 to fire for a portion of each cycle.

By exciting the flux valve with a half-wave rectified voltage from an alternating current source, the field windings of the motor may be energized by the same alternating current source without doubling the frequency. Also, by having the flux valve detect the relatively strong field of the permanent magnet instead of the earth's relatively weak field alone, the errors which would be present if half-wave rectified current were used to energize the flux valve are avoided.

With the magnet and flux valve suspension described herein, the magnet and flux valve are pendulously supported for rotation about a single point and remain parallel and coaxial irrespective of the attitude of the craft on which the compass system is mounted, and this reduces tilt error to a negligible amount.

While the system is described as being used to indicate direction, it should be understood that motor 46 may be used to operate a control surface of an aircraft, such as a rudder or aileron, to maintain the craft on a fixed course.

Although but on embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. In a compass system for a craft, a flux valve, a pendulous support for said flux valve providing for movement of said flux valve about mutually perpendicular axes, a permanent magnet associated with said flux valve, and means separate from said pendulous support for suspending said permanent magnet at substantially the point of intersection of said mutually perpendicular axes for rotation about the flux valve axis and for maintaining said permanent magnet in a plane parallel to the plane of said flux valve irrespective of the attitude of the craft.

2. Structure as described in claim 1 in which the permanent magnet and flux valve are immersed in a viscous fluid for damping their movements.

3. Structure as described in claim 1 in which the permanent magnet is pendulous and is supported by a pivot.

References Cited in the file of this patent

UNITED STATES PATENTS

| | | |
|---|---|---|
| 478,017 | Oliver | June 28, 1892 |
| 2,026,919 | Stright | Jan. 7, 1936 |
| 2,308,566 | Noxon | Jan. 19, 1943 |
| 2,349,963 | Harrison | May 30, 1944 |
| 2,361,433 | Stuart | Oct. 31, 1944 |
| 2,373,096 | Bonell | Apr. 10, 1945 |

FOREIGN PATENTS

| | | |
|---|---|---|
| 507,889 | Great Britain | June 22, 1939 |